No. 731,368. PATENTED JUNE 16, 1903.
M. R. HUTCHISON.
SPEED INDICATOR.
APPLICATION FILED SEPT. 24, 1902.
NO MODEL.

Witnesses
Inventor
Miller Reese Hutchison
By his Attorney

No. 731,368. Patented June 16, 1903.

UNITED STATES PATENT OFFICE.

MILLER REESE HUTCHISON, OF NORWOOD, NEW JERSEY.

SPEED-INDICATOR.

SPECIFICATION forming part of Letters Patent No. 731,368, dated June 16, 1903.

Application filed September 24, 1902. Serial No. 124,650. (No model.)

*To all whom it may concern:*

Be it known that I, MILLER REESE HUTCHISON, a citizen of the United States, residing at Norwood, in the county of Bergen and State of New Jersey, have invented certain new and useful Improvements in Speed-Indicators, of which the following is a full, clear, and exact description.

This invention relates to speed-indicators especially adapted for vehicles.

The object of the invention is to provide an apparatus which will automatically give an audible and visible indication of whether the vehicle is exceeding a predetermined critical speed.

A further object of the invention is to provide a device capable of being readily adjusted to give the required indication at different speeds and to show at all times the speed at which it is set to indicate.

In general terms the invention consists of a centrifugally-operated bell hammer or hammers, in combination with a conical bell so mounted that it can be moved with respect to the hammers, to thereby alter the length of stroke of the hammers.

The device also includes a visual sign, which is moved into view automatically by the movement of the bell to show at what speed the bell is adjusted to ring.

The invention will be described in detail with reference to the accompanying drawings, in which—

Figure 1:
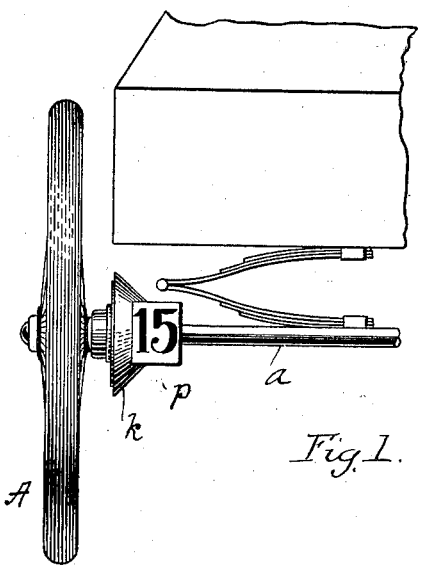
Figure 4:
Figure 5:
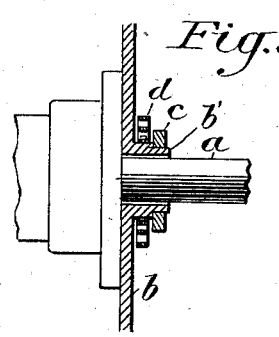
Figure 2:
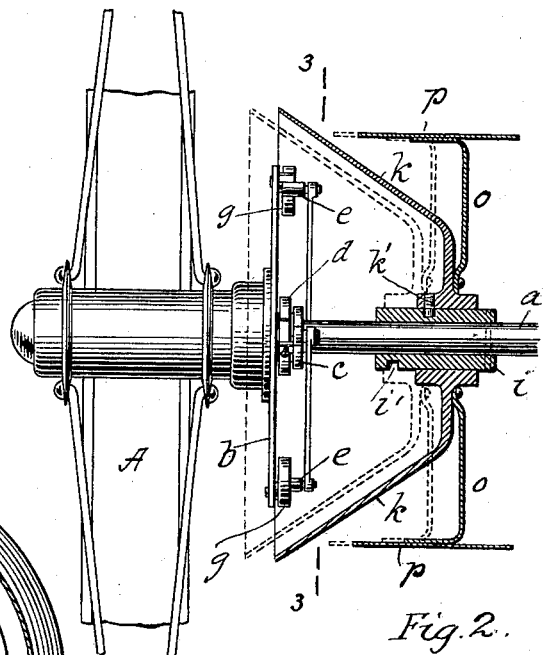
Figure 3:
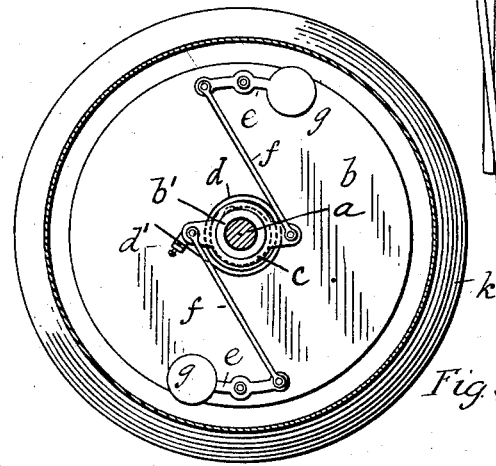

Figure 1 is a rear view of a portion of a vehicle, showing my improved indicator applied thereto. Fig. 2 is an enlarged sectional view of the indicator and a partial view of the wheel to which it is attached. Fig. 3 is a section on line 3 3 of Fig. 2. Fig. 4 is a detail. Fig. 5 is a sectional detail.

The invention is most useful in connection with self-propelling vehicles, the speed of operating which must be made to conform to the requirements and laws of the localities through which they are passing. It is rapidly becoming the practice to adopt standard speeds for city and country districts which the vehicles are not permitted to exceed. It is, however, difficult for the driver of a machine to accurately judge of its speed, and it is likewise difficult for an officer of the law or other observer to determine the rate of speed of a passing vehicle.

Referring to the accompanying drawings, A indicates one of the wheels of the vehicle, preferably a rear wheel. It is mounted, as usual, to turn on a stationary axle $a$. To the inner end of the hub of the wheel I rigidly attach in any suitable manner a disk or plate $b$, concentric with the axis. This disk has a collar $b'$, which projects over the axle $a$ and to which is applied a cross-head $c$, free to turn thereon. Between the cross-head and the disk is a spiral spring $d$, also surrounding the collar and having its inner end attached to the collar and its outer end adjustably attached to the cross-head by means of the set-screw $d'$. At diametrically opposite points near the edge of the disk are pivotally hung two levers $e\ e$, connected at one end, respectively, to the ends of the cross-head $c$ by the links $ff$ in reverse arrangement, so that when the free end of one lever tends to move outward the free end of the other lever must likewise move outward. On the free end of each lever is a heavy disk $g$, which serves the double purpose of a weight to obtain motion by centrifugal action and a bell-hammer.

Upon the stationary axle $a$ a short distance from the end of the hub is fixed a sleeve $i$, having a spiral groove $i'$ extending half-way around its surface. Upon this sleeve is fitted a bell or gong $k$, the sides of which are flaring or conical and extend beyond the edges of the disk $b$. The hub of the gong is provided with a pin $k'$, which enters the groove $i'$, so that by rotating the gong upon the sleeve through a half-turn the gong is caused to move toward or away from the disk $b$, depending upon the direction of rotation, and correspondingly altering the distance between the edge of the disk and the sides of the gong.

Attached to the gong by suitable arms or brackets $o\ o$ are two banners or signs $p\ p$, arranged diametrically opposite each other and so that one of them will be presented in a vertical plane rearwardly when the gong is in one of its positions, while the other will be presented rearwardly when the gong is in its other position. Upon the face of each banner may be placed figures or characters indicating when in view at what speed of the vehicle the gong will ring.

The operation of the invention is as follows: If we assume the speed which cannot be exceeded without violation of the law in cities and villages to be eight miles per hour and in the country districts fifteen miles per hour, one of the banners should bear the number "8" and the other the number "15," and they should be arranged so that when the gong is most remote from the bell-hammers the figures "15" are in view, while when the gong is in the nearer position to the hammers the figure "8" is in view. When running out of the city limits into the country, it is necessary for the driver to stop his vehicle, proceed to the rear, and turn the gong until the number "15" appears, and when he enters the city from the country districts he must stop his machine and rotate the gong to bring the figure "8" into view. In riding in either locality centrifugal action will cause the hammers $g\ g$ to make contact with the gong when the critical speed is reached, and the hammers in dragging along the surface of the gong will create a rumbling noise or tone which will indicate to all persons within hearing distance that the critical speed is reached or exceeded, and if the driver will be within the law he must reduce speed. An officer of the law can at once satisfy himself that the critical speed is not being exceeded if the proper sign is displayed and the gong is silent. Suitable means can easily be provided for causing the hammers to strike blows upon the bell instead of dragging in contact with its surface, and my invention is therefore not limited to the nature of the signal in this respect.

It will be seen that the spring $d$ opposes the outward movement of the hammers $g$. Consequently by adjusting the tension of the spring by pulling or slacking it past the set-screw $d'$ the accuracy of operation at the critical speeds can be determined. Indeed, the adjustment of the device from one speed to another can be accomplished by altering the tension of this spring; but as this is not a convenient method and it is desired to automatically adjust the visual signals at the same time it is preferred to rotate the gong. Jarring of the hammers when the vehicle passes over obstructions in the road will not cause the hammers to strike the gong. This is evident from the fact that such jars will act in the same direction upon each hammer, and by reason of the arrangement described the forces will oppose each other and the hammers will remain motionless.

Having described my invention, I claim—

1. A speed-indicator, consisting of a gong having conical sides, in combination with a concentrically-operated hammer located inside of the gong and operating in a plane at right angles to the axis of the gong and means for adjusting the position of the gong with respect to the hammer in an axial direction.

2. The combination of a wheel, centrifugal hammers applied thereto, an axle, a gong mounted to slide on said axle to alter its position with respect to the hammers and means whereby the gong will be simultaneously rotated when it slides.

3. In a speed-indicator, the combination of a centrifugal hammer, a gong having a motion to and from the hammer and a simultaneous rotary motion for adjustment and visual indicators carried by the gong.

In witness whereof I subscribe my signature in presence of two witnesses.

MILLER REESE HUTCHISON.

Witnesses:
FRANK S. OBER,
WALDO M. CHAPIN.